US012649488B2

(12) United States Patent
  Harada

(10) Patent No.:   US 12,649,488 B2
(45) Date of Patent:     Jun. 9, 2026

(54) MOBILE BODY CONTROL DEVICE, MOBILE BODY CONTROL METHOD, AND NON-TRANSITORY COMPUTER-READABLE STORAGE MEDIUM

(71) Applicant: HONDA MOTOR CO., LTD., Tokyo (JP)

(72) Inventor: Yuta Harada, Tokyo (JP)

(73) Assignee: HONDA MOTOR CO., LTD., Tokyo (JP)

( * ) Notice:   Subject to any disclaimer, the term of this patent is extended or adjusted under 35 U.S.C. 154(b) by 70 days.

(21) Appl. No.: 18/945,692

(22) Filed:   Nov. 13, 2024

(65) Prior Publication Data

US 2025/0206338 A1     Jun. 26, 2025

(30) Foreign Application Priority Data

Dec. 22, 2023   (JP) ................................. 2023-216720

(51) Int. Cl.
  B60W 60/00            (2020.01)

(52) U.S. Cl.
  CPC ....... B60W 60/001 (2020.02); B60W 2510/20 (2013.01); B60W 2520/14 (2013.01);
  (Continued)

(58) Field of Classification Search
  CPC ....... B60W 60/001; B60W 2554/4041; B60W 2554/4045; B60W 2552/10; B60W 2510/20; B60W 2520/14
  (Continued)

(56) References Cited

U.S. PATENT DOCUMENTS 5,467,283 A  *  11/1995  Butsuen ............... G05D 1/0257
                                                701/96
9,061,590 B2    6/2015  Kurumisawa et al.
                (Continued)

FOREIGN PATENT DOCUMENTS

JP        3164439 B2 *  5/2001   .......... B60T 8/17558
JP        4252719 B2 *  4/2009
JP        5522157 B2    6/2014

OTHER PUBLICATIONS

Madhuri Kashyap N. R., Analysis of Vehicle-Following Behavior in Mixed Traffic Conditions using Vehicle Trajectory Data, Sep. 16, 2020, Sage Journals, National Academy of Sciences: Transportation Research Board (Year: 2020).*
(Continued)

*Primary Examiner* — Matthias S Weisfeld
(74) *Attorney, Agent, or Firm* — Armstrong Teasdale LLP

(57)          ABSTRACT

A mobile body control device includes, an external environment detector configured to detect a peripheral mobile body, an estimated course calculator configured to calculate a first estimated course and a second estimated course, a preceding mobile body determiner configured to determine, as a preceding mobile body, the peripheral mobile body that overlaps with at least one of the first estimated course and the second estimated course, and a following controller configured to execute following control to follow the preceding mobile body. In a case where the peripheral mobile body to be determined as the preceding mobile body does not exist, the preceding mobile body determiner determines, as a preliminary preceding mobile body, the peripheral mobile body that overlaps with an intermediate area defined between the first estimated course and the second estimated course, and the following controller executes the following control to follow the preliminary preceding mobile body.

8 Claims, 5 Drawing Sheets

(52) U.S. Cl.
CPC . *B60W 2552/10* (2020.02); *B60W 2554/4041* (2020.02); *B60W 2554/4045* (2020.02)

(58) Field of Classification Search
USPC .......................................................... 701/25
See application file for complete search history.

(56) References Cited

U.S. PATENT DOCUMENTS

| | | | |
|---|---|---|---|
| 2019/0061758 A1* | 2/2019 | Ide ........................ | B60W 10/20 |
| 2024/0092357 A1* | 3/2024 | Kobilarov ......... | B60W 30/0956 |

OTHER PUBLICATIONS

Yifeng Zhang, Research on automobile four-wheel steering control system based on yaw angular velocity and centroid cornering angle, Dec. 23, 2021, Sage Journals, The Institute of Measurement and Control (Year: 2021).*

* cited by examiner

MOBILE BODY CONTROL DEVICE, MOBILE BODY CONTROL METHOD, AND NON-TRANSITORY COMPUTER-READABLE STORAGE MEDIUM

TECHNICAL FIELD

The present invention relates to a mobile body control device, a mobile body control method, and a non-transitory computer-readable storage medium.

BACKGROUND ART

In recent years, there have been increasing efforts to provide sustainable transportation systems that take into consideration vulnerable people among transport participants. To achieve this goal, research and development for driving assistance technologies and autonomous driving technologies is conducted to further improve traffic safety and convenience.

For example, Japanese Patent No. 5522157 discloses a determination method of a preceding vehicle to execute following travel. In this method, the preceding vehicle is determined based on an estimated course of an own vehicle and a position of the preceding vehicle. The estimated course of the own vehicle is determined based on a yaw rate.

By estimating the estimated course of the own vehicle using a steering angle, the estimated course of the own vehicle can be calculated more quickly at the entrance and exit of a curve than in a case of using a yaw rate since the yaw rate occurs with a delay relative to the steering angle. However, at the time of steering, the difference between a first estimated course based on the yaw rate and a second estimated course based on the steering angle becomes large, and the preceding vehicle that actually exists between the first estimated course and the second estimated course may not be detected as the preceding vehicle. In particular, when the steering angle is reduced, the difference between the first estimated course and the second estimated course may become large. In such a case, the own vehicle may lose sight of the preceding vehicle, which may result in unnecessary acceleration due to the following control.

SUMMARY OF THE INVENTION

In view of the above background, an object of the present invention is to provide a mobile body control device, a mobile body control method, and a non-transitory computer-readable storage medium that appropriately detect the preceding mobile body and execute following control at the time of steering. Accordingly, an aim of the present invention is to contribute to the development of sustainable transportation systems.

To achieve such an object, one aspect of the present invention provides a mobile body control device (15) configured to execute travel control of a mobile body (1), the mobile body control device comprising: an external environment detector (40) configured to detect at least one peripheral mobile body (105) that exists on a periphery of the mobile body; an estimated course calculator (42) configured to calculate a first estimated course (101) based on a yaw rate of the mobile body and calculate a second estimated course (102) based on a steering angle of the mobile body; a preceding mobile body determiner (43) configured to determine, as a preceding mobile body (106), the peripheral mobile body that overlaps with at least one of the first estimated course and the second estimated course based on the first estimated course, the second estimated course, and a position of the peripheral mobile body; and a following controller (44) configured to execute following control to follow the preceding mobile body, wherein in a case where the peripheral mobile body to be determined as the preceding mobile body does not exist, the preceding mobile body determiner is configured to determine, as a preliminary preceding mobile body (107), the peripheral mobile body that overlaps with an intermediate area (103) defined between the first estimated course and the second estimated course, and the following controller is configured to execute the following control to follow the preliminary preceding mobile body.

According to this aspect, at the time of steering when the first estimated course and the second estimated course are different, the mobile body control device can appropriately detect, as the preliminary preceding mobile body, the peripheral mobile body that exists between the first estimated course and the second estimated course. Further, the mobile body control device executes the following control to follow the preliminary preceding mobile body, thereby avoiding unnecessary acceleration. Accordingly, it is possible to provide a mobile body control device that appropriately detects the preceding mobile body and executes the following control.

In the above aspect, preferably, after the following controller starts the following control to follow the preliminary preceding mobile body and until the preceding mobile body determiner determines a new preceding mobile body, the following controller is configured to continue the following control to follow the preliminary preceding mobile body.

According to this aspect, the mobile body control device can continue the following control to follow the preliminary preceding mobile body until the preceding mobile body is detected.

In the above aspect, preferably, in a case where the preceding mobile body determiner determines the new preceding mobile body after the following controller starts the following control to follow the preliminary preceding mobile body, the following controller executes the following control to follow the new preceding mobile body.

According to this aspect, the mobile body control device can continue the following control to follow the preliminary preceding mobile body until the preceding mobile body is detected.

In the above aspect, preferably, in a case where a plurality of peripheral mobile bodies overlaps with the intermediate area, the preceding mobile body determiner is configured to determine, as the preliminary preceding mobile body, the peripheral mobile body arranged at a shortest distance from the mobile body.

According to this aspect, the mobile body control device can determine, as the preliminary preceding mobile body, the peripheral mobile body arranged at a shortest distance from the mobile body, and can execute the following control to follow the preliminary preceding mobile body.

In the above aspect, preferably, in a case where a plurality of peripheral mobile bodies overlaps with the intermediate area, the preceding mobile body determiner is configured to acquire a lane change direction and determine, as the preliminary preceding mobile body, the peripheral mobile body arranged closest to a side of the lane change direction among the plurality of peripheral mobile bodies.

According to this aspect, the mobile body control device can determine, as the preliminary preceding mobile body, the peripheral mobile body arranged closest to a side of the lane change direction among the plurality of peripheral mobile bodies arranged in the intermediate area.

In the above aspect, preferably, the preceding mobile body determiner is configured to determine the peripheral mobile body as the preliminary preceding mobile body upon detecting at a prescribed determination frequency that the peripheral mobile body overlaps with the intermediate area, to acquire a lane change direction, to divide the intermediate area into a first area and a second area based on the lane change direction, the first area being an area on a side of the lane change direction, the second area being an area on a side opposite to the lane change direction, and to set a second determination frequency greater than a first determination frequency, the second determination frequency being the determination frequency for determining the peripheral mobile body in the second area as the preliminary preceding mobile body, the first determination frequency being the determination frequency for determining the peripheral mobile body in the first area as the preliminary preceding mobile body.

According to this aspect, the mobile body control device can determine, as the preliminary preceding mobile body, the peripheral mobile body arranged on a side of the lane change direction among the plurality of peripheral mobile bodies arranged in the intermediate area.

Another aspect of the present invention provides a mobile body control method executed by a computer to execute travel control of a mobile body (1), the mobile body control method comprising: detecting at least one peripheral mobile body (105) that exists on a periphery of the mobile body; calculating a first estimated course (101) based on a yaw rate of the mobile body; calculating a second estimated course (102) based on a steering angle of the mobile body; determining, as a preceding mobile body (106), the peripheral mobile body that overlaps with at least one of the first estimated course and the second estimated course based on the first estimated course, the second estimated course, and a position of the peripheral mobile body; causing the mobile body to follow the preceding mobile body; determining, as a preliminary preceding mobile body (107), the peripheral mobile body that overlaps with an intermediate area (103) defined between the first estimated course and the second estimated course in a case where the peripheral mobile body to be determined as the preceding mobile body does not exist; and causing the mobile body to follow the preliminary preceding mobile body.

Still another aspect of the present invention provides a non-transitory computer-readable storage medium comprising a program for executing travel control of a mobile body (1), wherein the program, when executed by a computer (15), executes a mobile body control method comprising: detecting at least one peripheral mobile body (105) that exists on a periphery of the mobile body; calculating a first estimated course (101) based on a yaw rate of the mobile body; calculating a second estimated course (102) based on a steering angle of the mobile body; determining, as a preceding mobile body (106), the peripheral mobile body that overlaps with at least one of the first estimated course and the second estimated course based on the first estimated course, the second estimated course, and a position of the peripheral mobile body; causing the mobile body to follow the preceding mobile body; determining, as a preliminary preceding mobile body (107), the peripheral mobile body that overlaps with an intermediate area (103) defined between the first estimated course and the second estimated course in a case where the peripheral mobile body to be determined as the preceding mobile body does not exist; and causing the mobile body to follow the preliminary preceding mobile body.

Thus, according to the above aspects, it is possible to provide a mobile body control device, a mobile body control method, and a non-transitory computer-readable storage medium that appropriately detect the preceding mobile body and execute following control at the time of steering.

BRIEF DESCRIPTION OF THE DRAWING(S)

DETAILED DESCRIPTION OF THE INVENTION

Hereinafter, with reference to the drawings, an embodiment of a mobile body control device, a mobile body control method, and a non-transitory computer-readable storage medium according to the present invention will be described. A mobile body includes a vehicle such as an automobile, a truck, and a motorcycle, an electric kick scooter, and the like. In the present embodiment, an example in which the mobile body is a vehicle will be described.

Figure 1:
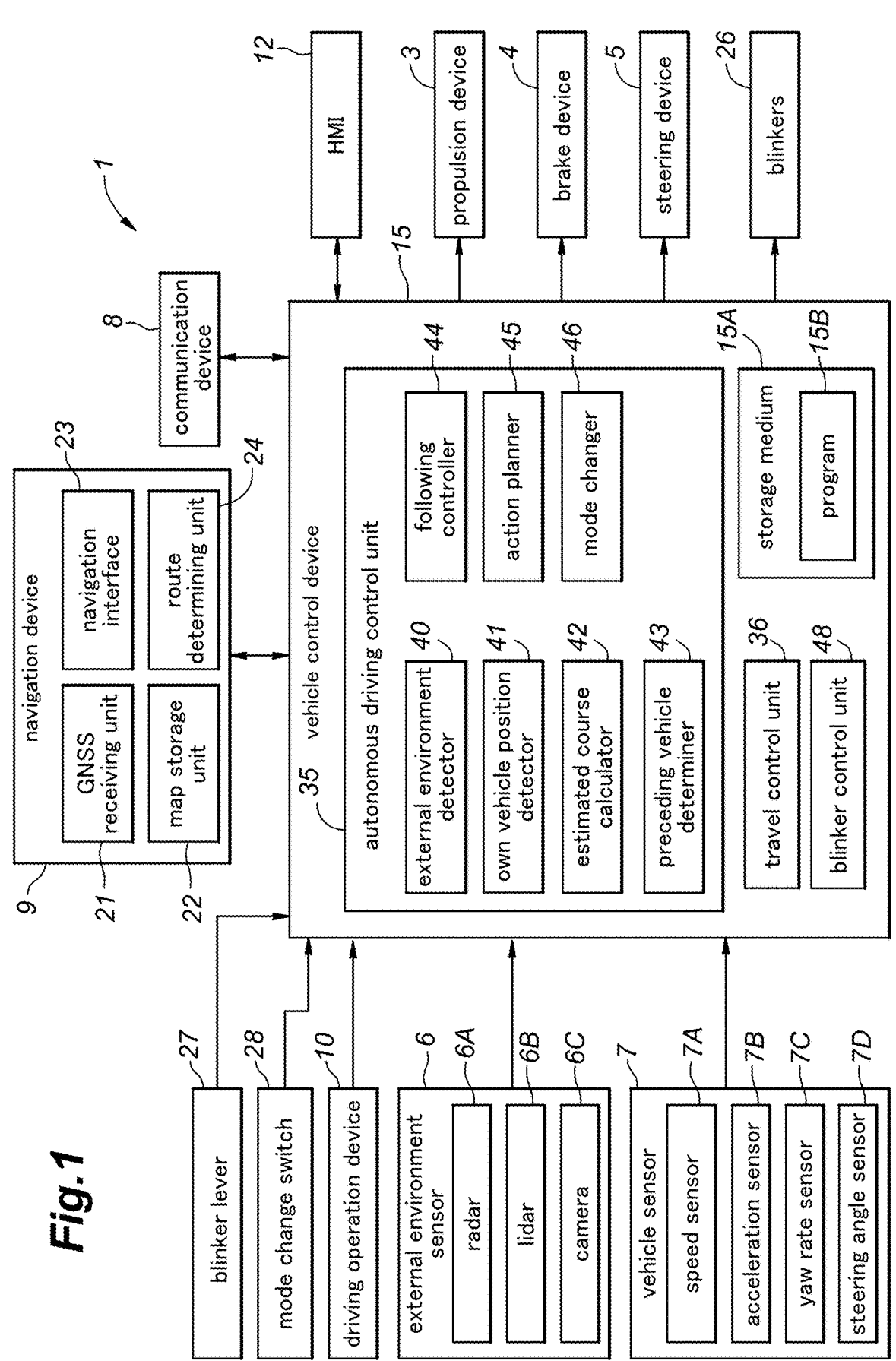
FIG. 1 is a block diagram of a vehicle in which a vehicle control device is installed.

As shown in FIG. 1, the vehicle 1 (mobile body) includes a propulsion device 3, a brake device 4, a steering device 5, an external environment sensor 6, a vehicle sensor 7, a communication device 8, a navigation device 9, a driving operation device 10, a human machine interface 12 (HMI), and a vehicle control device 15 (mobile body control device).

The propulsion device 3 is a device that applies a driving force to the vehicle 1, and includes, for example, a power source and a transmission. The power source includes at least one of an internal combustion engine such as a gasoline engine and a diesel engine, and an electric motor. The brake device 4 is a device that applies a braking force to the vehicle 1, and includes, for example, a brake caliper that presses a pad against a brake rotor, and an electric cylinder that supplies hydraulic pressure to the brake caliper. The brake device 4 may further include a parking brake device that restricts the rotation of wheels by a wire cable. The steering device 5 is a device that changes a steering angle of the wheels, and includes, for example, a rack-and-pinion mechanism that steers the wheels, and an electric motor that drives the rack-and-pinion mechanism. The propulsion device 3, the brake device 4, and the steering device 5 are controlled by the vehicle control device 15.

The external environment sensor 6 is a sensor that captures electromagnetic waves or light from the periphery of the vehicle 1 and detects objects and the like outside the vehicle 1. The external environment sensor 6 includes, for example, a radar 6A, a lidar 6B (LiDAR), and a camera 6C

(external camera). The external environment sensor 6 outputs a detection result to the vehicle control device 15.

The radar 6A detects the position (distance and direction) of each object by emitting radio waves such as millimeter waves toward the periphery of the vehicle 1 and capturing the reflected waves thereof. At least one radar 6A is attached to any portion of the vehicle 1. It is preferable that the radar 6A includes at least a front radar that emits radio waves toward the front of the vehicle 1, a rear radar that emits radio waves toward the rear of the vehicle 1, and a pair of left and right side radars that emits radio waves toward the lateral sides of the vehicle 1.

The lidar 6B detects the position (distance and direction) of each object by emitting light such as infrared rays toward the periphery of the vehicle 1 and capturing the reflected light thereof. At least one lidar 6B is provided at any portion of the vehicle 1.

The camera 6C captures images of the periphery of the vehicle 1 such as the objects (for example, peripheral vehicles 105 (peripheral mobile bodies) and pedestrians) that exist on the periphery of vehicle 1, the shapes of guardrails, curbs, walls, median strips, and roads, and the road markings painted on the roads. The camera 6C may be, for example, a digital camera using a solid-state image sensing device such as a CCD or a CMOS. At least one camera 6C is provided at any portion of the vehicle 1. The camera 6C includes at least a front camera that captures the image of the front of the vehicle 1. The camera 6C may further include a rear camera that captures the image of the rear of the vehicle 1, and a pair of side cameras that captures the images of the lateral sides of the vehicle 1. The camera 6C may be, for example, a stereo camera.

The vehicle sensor 7 includes a speed sensor 7A that detects the speed (vehicle speed) of the vehicle 1, an acceleration sensor 7B that detects the acceleration of the vehicle 1, a yaw rate sensor 7C that detects the yaw rate of the vehicle 1, and a steering angle sensor 7D that detects the steering angle of front wheels as steered wheels.

The communication device 8 mediates communication between the devices (the vehicle control device 15 and the navigation device 9) arranged inside the vehicle 1 and the devices (the peripheral vehicles 105 and servers) arranged outside the vehicle 1. The vehicle control device 15 can wirelessly communicate with the peripheral vehicles 105 via the communication device 8.

The navigation device 9 is a device that acquires the current position of the vehicle 1 and provides route guidance to the destination and the like. The navigation device 9 includes a GNSS receiving unit 21, a map storage unit 22, a navigation interface 23, and a route determining unit 24. The GNSS receiving unit 21 identifies the position (latitude and longitude) of the vehicle 1 based on the signals received from artificial satellites (positioning satellites). The map storage unit 22 is composed of a known storage device such as a flash memory or a hard disk, and stores map information.

The map information includes road information including a road type such as an expressway, a toll road, a national road, and a prefectural road, the number of lanes on each road, a center position (a three-dimensional coordinate including longitude, latitude, and height) of each lane, the shapes of road markings such as road partition lines and lane boundaries, the presence or absence of sidewalks, curbs, fences, and the like, the positions of intersections, the positions of lane merging points and lane branching points, the areas of emergency parking zones, the width of each lane, road markings, and the like. The map information may also include traffic regulation information, address information (address and postal code), facility information, telephone number information, and the like. The route determining unit 24 determines a route to the destination based on the position of the vehicle 1 identified by the GNSS receiving unit 21, the destination input from the navigation interface 23, and the map information. Further, when determining the route, the route determining unit 24 may further determine a target lane in which the vehicle 1 should travel by referring to the positions of lane merging points and lane branching points in the map information.

The driving operation device 10 accepts an input operation performed by a driver to control the vehicle 1. The driving operation device 10 includes, for example, a steering wheel, an accelerator pedal, and a brake pedal. The driving operation device 10 may further include a shift lever, a parking brake lever, and the like. A sensor that detects the operation amount of the input operation is attached to each component of the driving operation device 10. The driving operation device 10 outputs a signal indicating the operation amount to the vehicle control device 15.

The HMI 12 notifies an occupant (for example, the driver) of various information by display and sound, and accepts an input operation by the occupant.

The vehicle 1 further includes blinkers 26 that indicate a lane change direction and a turning direction. The blinkers 26 are light-emitting devices that blink, and are provided on both lateral sides of the front and rear portions of the vehicle 1. The blinkers 26 are connected to the vehicle control device 15. The vehicle 1 further includes a blinker lever 27 that is operated by the occupant. The blinker lever 27 is connected to the vehicle control device 15.

The vehicle 1 further includes a mode change switch 28 that accepts an operation to switch the level of autonomous driving.

The vehicle control device 15 is an electronic control unit (ECU), namely, a computer, composed of an MPU (microprocessor), ROM, RAM, and the like. The vehicle control device 15 executes various vehicle control as the MPU executes a calculation process according to a program. The vehicle control device 15 may be configured as a single piece of hardware, or may be configured as a unit composed of plural pieces of hardware. Furthermore, at least a portion of each functional unit of the vehicle control device 15 may be realized by hardware such as an LSI, an ASIC, and an FPGA, or may be realized by a combination of software and hardware. The program may be stored in a non-volatile storage device such as an HDD and flash memory of the vehicle control device 15. Alternatively, the program may be stored in a removable storage medium such as a DVD or a CD-ROM and installed in the storage device of the vehicle control device 15 as the storage medium is read by a reading device. Alternatively, the program may be downloaded in the storage device of the vehicle control device 15 via a communication line such as the Internet and installed in the storage device thereof. The vehicle control device 15 as a computer executes a travel control method that will be described later for executing travel control of the vehicle 1. The program causes the vehicle control device 15 to execute the travel control of the vehicle 1 (mobile body). As shown in FIG. 1, the vehicle control device 15 includes a non-transitory computer-readable storage medium 15A including a program 15B for executing the travel control of the vehicle 1. The program 15B, when executed by the vehicle control device 15 as a computer, executes a vehicle control method (mobile body control method) that will be described later.

As shown in FIG. 1, the vehicle control device 15 includes an autonomous driving control unit 35 and a travel control unit 36. The autonomous driving control unit 35 includes an external environment detector 40, an own vehicle position detector 41, an estimated course calculator 42, a preceding vehicle determiner 43 (preceding mobile body determiner), a following controller 44, an action planner 45, and a mode changer 46.

The autonomous driving control unit 35 combines various types of vehicle control to execute each level of autonomous driving control. For example, in the autonomous driving of level 0, the vehicle control device 15 does not control the vehicle 1, and the driver performs all the driving operations. The autonomous driving of level 1 includes constant speed and inter-vehicle distance control (adaptive cruise control: ACC) and lane keeping assistance control (lane keeping assistance: LKA). In the autonomous driving of levels 2 and 3, the driver monitors the periphery of the vehicle 1, and the vehicle control device 15 executes all the driving operations. In the autonomous driving of levels 2 and 3, the degree to which the driver monitors the periphery of the vehicle 1 is different.

The external environment detector 40 detects obstacles that exist on the periphery of the vehicle 1, the shapes of roads, the presence or absence of sidewalks, and road markings based on the signal from the external environment sensor 6. The obstacles include, for example, guardrails, utility poles, peripheral mobile bodies, and people such as pedestrians. The peripheral mobile body includes vehicles (peripheral vehicles 105). The external environment detector 40 may detect the positions and distances of the obstacles, the peripheral vehicles 105, and the like relative to the vehicle 1 based on the signal from at least one of the radar 6A, the lidar 6B, and the camera 6C.

The own vehicle position detector 41 calculates an own vehicle position based on the signals (GNSS signals) received by the GNSS receiving unit 21. Further, the own vehicle position detector 41 recognizes a travel lane that is a lane in which the vehicle 1 is traveling, and a relative position and angle of the vehicle 1 relative to the travel lane. The own vehicle position detector 41 may, for example, recognize the travel lane based on the map information stored in the map storage unit 22 and the position of the vehicle 1 acquired (identified) by the GNSS receiving unit 21. Further, the own vehicle position detector 41 may recognize the relative position and angle of the vehicle 1 relative to the travel lane by extracting, from the map information, the partition lines on the periphery of the vehicle 1 drawn on a road surface and comparing the extracted partition lines with the shapes of the partition lines captured by the camera 6C.

The estimated course calculator 42 calculates a first estimated course 101 based on the yaw rate of the vehicle 1, and calculates a second estimated course 102 based on the steering angle of the vehicle 1. As shown in FIGS. 3A-3D, the first estimated course 101 and the second estimated course 102 are expressed as curves (or straight lines) connecting estimated positions of the vehicle 1 at each future time. The estimated course calculator 42 may calculate the first estimated course 101 based on the yaw rate and vehicle speed of the vehicle 1. Further, the estimated course calculator 42 may calculate the second estimated course 102 based on the steering angle and vehicle speed of the vehicle 1. Since the yaw rate changes according to the change in the steering angle, the change in the yaw rate occurs with a delay relative to the change in the steering angle. Accordingly, when the steering angle changes, the first estimated course

Figure 3:
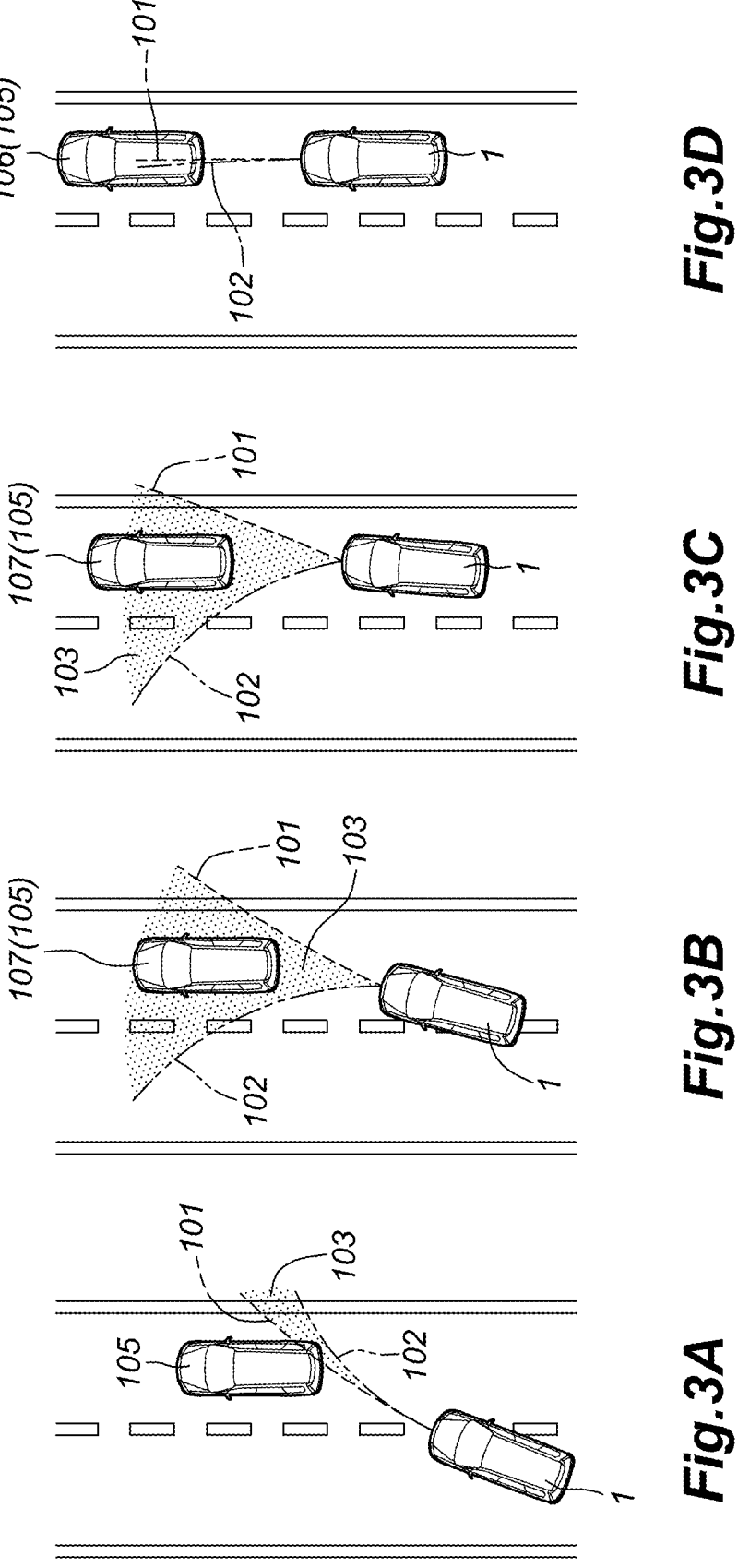
FIGS. 3A to 3D are explanatory diagrams showing a determination method of a preliminary preceding vehicle and a preceding vehicle at the time of a lane change.

101 changes with a delay relative to the change in the second estimated course 102, which causes the difference between the first estimated course 101 and the second estimated course 102 (see FIGS. 3B and 3C). When the steering angle is constant, the first estimated course 101 and the second estimated course 102 are substantially the same (see FIG. 3D).

The preceding vehicle determiner 43 determines a preceding vehicle 106 or a preliminary preceding vehicle 107 among the peripheral vehicles 105. The preceding vehicle determiner 43 determines the preceding vehicle 106 or the preliminary preceding vehicle 107 by executing a preceding vehicle determination process that will be described later.

The following controller 44 executes following control to follow the preceding vehicle 106 or the preliminary preceding vehicle 107. The following controller 44 sets, by the following control, a target vehicle speed of the vehicle 1 such that the inter-vehicle distance between the vehicle 1 and the preceding vehicle 106 becomes a prescribed value in a case where the vehicle speed of the preceding vehicle 106 is slower than the set vehicle speed of the vehicle 1.

The action planner 45 sequentially generates an action plan for causing the vehicle 1 to travel along the route. More specifically, first, the action planner 45 determines events for the vehicle 1 to travel in the target lane determined by the route determining unit 24 without coming into contact with any obstacles. The action planner 45 generates a target trajectory on which the vehicle 1 should travel in the future based on the determined events. The target trajectory is a sequence of trajectory points that are the points the vehicle 1 should reach at each time. The action planner 45 may generate the target trajectory based on the target vehicle speed and target acceleration set for each event. In a case where the action planner 45 detects the preceding vehicle 106 on the target trajectory, the action planner 45, similar to the following controller 44, may execute the following control to follow the preceding vehicle 106.

The mode changer 46 changes the level of the autonomous driving based on the signal from the mode change switch 28. In a case where level 0 is selected by the mode change switch 28, the mode changer 46 stops the calculations by the following controller 44 and the action planner 45. In a case where level 1 is selected by the mode change switch 28, the mode changer 46 executes the calculations by the following controller 44 and stops the calculations by the action planner 45. In a case where level 2 or higher is selected by the mode change switch 28, the mode changer 46 executes the calculations by the action planner 45 and stops the calculations by the following controller 44.

The travel control unit 36 controls the propulsion device 3, the brake device 4, and the steering device 5 based on the target vehicle speed generated (set) by the following controller 44. Further, the travel control unit 36 controls the propulsion device 3, the brake device 4, and the steering device 5 such that the vehicle 1 passes through the target trajectory generated by the action planner 45 at the scheduled time.

The vehicle control device 15 further includes a blinker control unit 48 that controls lighting of the blinkers 26. The blinker control unit 48 receives the signal from the blinker lever 27 and outputs a control signal for controlling the blinkers 26.

Figure 2:
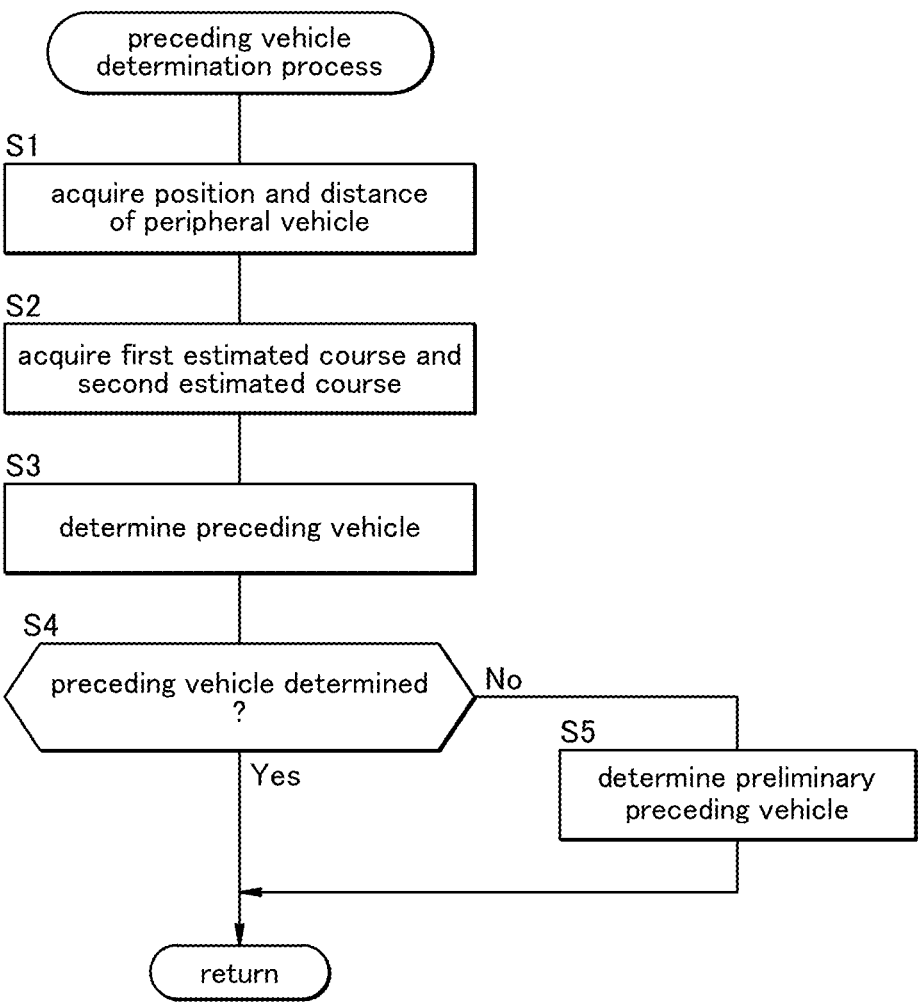
FIG. 2 is a flowchart of a preceding vehicle determination process.

In the following, the preceding vehicle determination process executed by the preceding vehicle determiner 43 will be described. The preceding vehicle determiner 43 may repeat the preceding vehicle determination process shown in FIG. 2 at time intervals of, for example, several microseconds. First, the preceding vehicle determiner 43 acquires, from the external environment detector 40, the information about the position of each peripheral vehicle 105 and the distance between each peripheral vehicle 105 and the vehicle 1 (S1). The number of peripheral vehicles 105 is equal to or more than zero. The distance between each peripheral vehicle 105 and the vehicle 1 may be a Euclidean distance.

Next, the preceding vehicle determiner 43 acquires the first estimated course 101 and the second estimated course 102 calculated by the estimated course calculator 42 (S2).

Next, the preceding vehicle determiner 43 determines, as the preceding vehicle 106, the peripheral vehicle 105 that overlaps with both the first estimated course 101 and the second estimated course 102 based on the first estimated course 101, the second estimated course 102, and a position of each peripheral vehicle 105 (S3). In a case where a plurality of peripheral vehicles 105 overlaps with both the first estimated course 101 and the second estimated course 102, the preceding vehicle determiner 43 may determine, as the preceding vehicle 106, the peripheral vehicle 105 arranged at the shortest distance from the vehicle 1 among the plurality of peripheral vehicles 105 that overlaps with both the first estimated course 101 and the second estimated course 102.

Next, the preceding vehicle determiner 43 determines whether the preceding vehicle 106 can be determined in step S3 (whether the peripheral vehicle 105 to be determined as the preceding vehicle 106 exists in step S3) (S4). In a case where the preceding vehicle 106 can be determined in step S3 (the determination result in S4 is Yes), the preceding vehicle determiner 43 ends the preceding vehicle determination process.

In a case where the preceding vehicle 106 cannot be determined in step S3 (the determination result in S4 is No), that is, in a case where the peripheral vehicle 105 to be determined as the preceding vehicle 106 does not exist, the preceding vehicle determiner 43 determines, as the preliminary preceding vehicle 107, the peripheral vehicle 105 that overlaps with an intermediate area 103 defined between the first estimated course 101 and the second estimated course 102 (S5). In this regard, "the peripheral vehicle 105 overlaps with the intermediate area 103" means "the representative position of the peripheral vehicle 105 is arranged in the intermediate area 103". The representative position of the peripheral vehicle 105 may be, for example, the central position of the peripheral vehicle 105. Further, in a case where the peripheral vehicle 105 is expressed by a plurality of outer edge positions corresponding to an outer edge of the peripheral vehicle 105, "the peripheral vehicle 105 overlaps with the intermediate area 103" may mean "at least one of the plurality of outer edge positions is arranged in the intermediate area 103". The preceding vehicle determiner 43 may calculate the intermediate area 103 based on the estimated position at each time included in the first estimated course 101 and the second estimated course 102.

In one aspect, in a case where a plurality of peripheral vehicles 105 overlaps with the intermediate area 103, the preceding vehicle determiner 43 may determine, as the preliminary preceding vehicle 107, the peripheral vehicle 105 arranged at the shortest distance from the vehicle 1. The distance between the vehicle 1 and each peripheral vehicle 105 may be, for example, a distance between the central portion at a front end of the vehicle 1 and the central portion at a rear end of each peripheral vehicle 105. Alternatively, the distance between the vehicle 1 and each peripheral vehicle 105 may be a distance between the central portion of the vehicle 1 and the central portion of each peripheral vehicle 105.

In step S5, in a case where the peripheral vehicle 105 that overlaps with the intermediate area 103 does not exist, the preceding vehicle determiner 43 determines that the preliminary preceding vehicle 107 does not exist. After executing the process of step S5, the preceding vehicle determiner 43 ends the preceding vehicle determination process. The preceding vehicle determiner 43 repeats the preceding vehicle determination process at prescribed intervals, thereby updating the preceding vehicle 106 and the preliminary preceding vehicle 107.

The following controller 44 executes the following control to follow the preceding vehicle 106 or the preliminary preceding vehicle 107. The following controller 44 may make the control manner in the following control to follow the preceding vehicle 106 identical to or different from the control manner in the following control to follow the preliminary preceding vehicle 107.

The action and effects of the vehicle control device 15 configured as described above, the vehicle control method executed by the vehicle control device 15, and the non-transitory computer-readable storage medium 15A for causing the vehicle control device 15 to execute the vehicle control method will be described.

When the steering angle is constant, the first estimated course 101 calculated based on the yaw rate and the second estimated course 102 calculated based on the steering angle substantially match each other. Accordingly, when the vehicle 1 is traveling on a straight road, the first estimated course 101 and the second estimated course 102 each extend straight forward, and match each other. Accordingly, when the peripheral vehicle 105 exists in front of the vehicle 1, the peripheral vehicle 105 overlaps with the first estimated course 101 and the second estimated course 102, and is determined as the preceding vehicle 106. Furthermore, when the vehicle 1 is traveling along a curve with a constant curvature, the first estimated course 101 and the second estimated course 102 each curve along the curve, and match each other. Accordingly, when the peripheral vehicle 105 exists on the course of the vehicle 1, the peripheral vehicle 105 overlaps with the first estimated course 101 and the second estimated course 102, and is determined as the preceding vehicle 106.

By contrast, immediately after the wheels are steered, the yaw rate occurs with a delay relative to the steering angle, which causes the difference between the first estimated course 101 and the second estimated course 102. In particular, as shown in FIGS. 3A to 3C, in a case where the steering angle is increased and then reduced in a short period (for example, at the time of a lane change), the difference between the first estimated course 101 and the second estimated course 102 becomes large when the steering angle is reduced. At the start of the lane change, the steering angle increases, and the yaw rate occurs with a delay relative to the increase in the steering angle, so that the first estimated course 101 is delayed relative to the second estimated course 102 (see FIG. 3A). In the latter half of the lane change, the steering angle is reduced in the direction opposite to the direction of the yaw rate, so that the difference between the first estimated course 101 and the second estimated course 102 becomes large (see FIGS. 3B and 3C). In such a case, even if the peripheral vehicle 105 actually exists in front of the vehicle 1, the peripheral vehicle 105 cannot overlap with both the first estimated course 101 and the second estimated course 102, and is not determined as the preceding vehicle 106.

In such a case, the preceding vehicle determiner 43 of the vehicle control device 15 determines, as the preliminary preceding vehicle 107, the peripheral vehicle 105 that overlaps with the intermediate area 103 defined between the first estimated course 101 and the second estimated course 102, and the following controller 44 executes the following control to follow the preliminary preceding vehicle 107. Since the vehicle control device 15 can execute the following control to follow the preliminary preceding vehicle 107, the vehicle control device 15 does not overlook the peripheral vehicle 105 that actually exists in front of the vehicle 1, thereby avoiding unnecessary acceleration. Accordingly, the vehicle control device 15 can appropriately execute the following control even at the time of the lane change.

As shown in FIG. 3D, when the lane change is completed and the steering angle returns to zero degrees, the yaw rate also becomes zero with a delay relative to the steering angle, and the first estimated course 101 and the second estimated course 102 extend straight in front of the vehicle 1. Accordingly, the peripheral vehicle 105, which has been determined as the preliminary preceding vehicle 107, overlaps with both the first estimated course 101 and the second estimated course 102. Accordingly, the preceding vehicle determiner 43 determines the peripheral vehicle 105 as the preceding vehicle 106. In this way, after the following controller 44 starts the following control to follow the preliminary preceding vehicle 107 until the preceding vehicle determiner 43 determines a new preceding vehicle 106, the following controller 44 continues the following control to follow the preliminary preceding vehicle 107. Furthermore, in a case where the preceding vehicle determiner 43 determines the new preceding vehicle 106 after the following controller 44 starts the following control to follow the preliminary preceding vehicle 107, the following controller 44 executes the following control to follow the new preceding vehicle 106. Accordingly, the vehicle control device 15 can continue the following control without losing sight of the peripheral vehicle 105 that exists in front of the vehicle 1.

Figure 4:
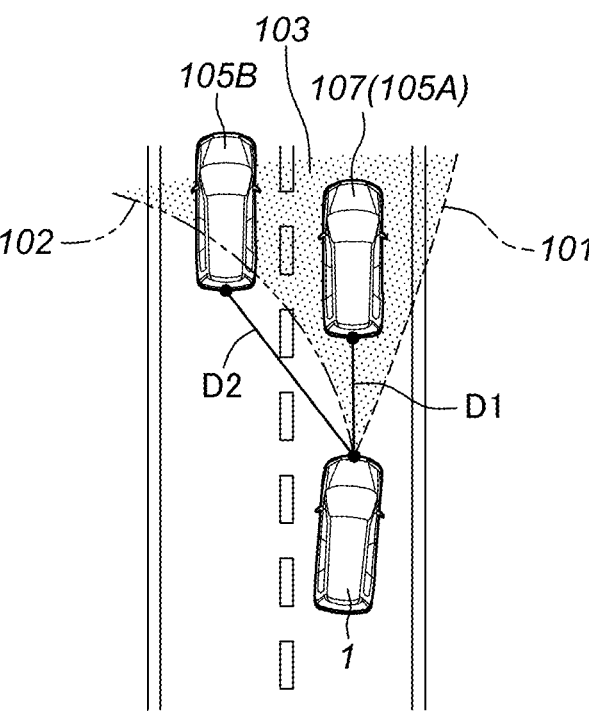
FIG. 4 is an explanatory diagram showing one determination method of the preliminary preceding vehicle in a case where a plurality of peripheral vehicles exists in an intermediate area.

As shown in FIG. 4, in a case where a plurality of peripheral vehicles 105 overlaps with the intermediate area 103, the preceding vehicle determiner 43 determines, as the preliminary preceding vehicle 107, the peripheral vehicle 105 arranged at the smallest distance from the vehicle 1. In FIG. 4, a first peripheral vehicle 105A and a second peripheral vehicle 105B overlap with the intermediate area 103, and the distance D1 between the first peripheral vehicle 105A and the vehicle 1 is smaller than the distance D2 between the second peripheral vehicle 105B and vehicle 1, so that the first peripheral vehicle 105A is determined as the preliminary preceding vehicle 107. Accordingly, it is possible to appropriately determine the preliminary preceding vehicle 107 in a case where the plurality of peripheral vehicles 105 exists in the intermediate area 103.

In another aspect, in a case where a plurality of peripheral vehicles 105 overlaps with the intermediate area 103, the preceding vehicle determiner 43 may acquire a lane change direction, and determine, as the preliminary preceding vehicle 107, the peripheral vehicle 105 arranged closest to a side of the lane change direction among the plurality of peripheral vehicles 105. The preceding vehicle determiner 43 may acquire the lane change direction based on the control signal of the blinkers 26. Alternatively, the preceding vehicle determiner 43 may acquire the lane change direction based on the signal from the blinker lever 27.

12

Figure 5:
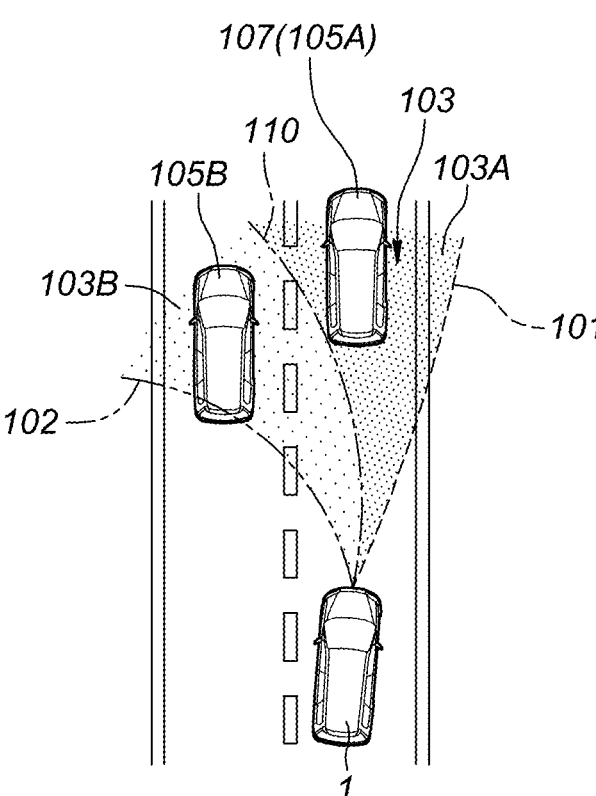
FIG. 5 is an explanatory diagram showing another determination method of the preliminary preceding vehicle in a case where a plurality of peripheral vehicles exists in the intermediate area.

In another aspect, the preceding vehicle determiner 43 may determine the peripheral vehicle 105 as the preliminary preceding vehicle 107 upon detecting at a prescribed determination frequency (upon detecting the prescribed number of times) that the peripheral vehicle 105 overlaps with the intermediate area 103. In such a case, the preceding vehicle determiner 43 may vary the determination frequency in each portion of the intermediate area 103. As shown in FIG. 5, for example, the preceding vehicle determiner 43 may divide the intermediate area 103 into a first area 103A and a second area 103B based on the lane change direction. The first area 103A is an area on a side of the lane change direction. The second area 103B is an area on a side opposite to the lane change direction. That is, the intermediate area 103 may be divided into two areas with respect to the lateral direction along a centerline 110. The centerline 110 may be calculated as a line extending from the vehicle 1 through the center of the intermediate area 103 between the first estimated course 101 and the second estimated course 102. A second determination frequency may be set greater than a first determination frequency. The second determination frequency is the determination frequency for determining the peripheral vehicle 105 in the second area 103B as the preliminary preceding vehicle 107. The first determination frequency is the determination frequency for determining the peripheral vehicle 105 in the first area 103A as the preliminary preceding vehicle 107. The centerline 110 may also be defined as a line extending forward from the vehicle 1 relative to the vehicle 1, that is, a line passing through the center of gravity of the vehicle 1 and extending in the length direction (longitudinal direction) of the vehicle 1.

FIG. 5 shows an example at the time of a lane change where a first peripheral vehicle 105A and a second peripheral vehicle 105B are arranged in the intermediate area 103. The first peripheral vehicle 105A is in a first area 103A of the intermediate area 103 on a side of the lane change direction, and the second peripheral vehicle 105B is in a second area 103B of the intermediate area 103 on a side opposite to the lane change direction. Upon detecting twice that a peripheral vehicle 105 (first peripheral vehicle 105A) overlaps with the first area 103A, the preceding vehicle determiner 43 determines the peripheral vehicle 105 (first peripheral vehicle 105A) as the preliminary preceding vehicle 107. Furthermore, upon detecting three times that a peripheral vehicle 105 (second peripheral vehicle 105B) overlaps with the second area 103B, the preceding vehicle determiner 43 determines the peripheral vehicle 105 (second peripheral vehicle 105B) as the preliminary preceding vehicle 107. In the example of FIG. 5, the determination frequency of the first area 103A (first determination frequency) is set smaller than the determination frequency of the second area 103B (second determination frequency). Accordingly, the first peripheral vehicle 105A that exists in the first area 103A is preferentially determined as the preliminary preceding vehicle 107. Accordingly, the peripheral vehicle 105 arranged on the side of the lane change direction of the intermediate area 103 is determined as the preliminary preceding vehicle 107.

This concludes the explanation of the specific embodiment, but the present invention can be widely modified and implemented without being limited to the above embodiment. In another embodiment, when a plurality of peripheral vehicles 105 exists in the intermediate area 103, the preceding vehicle determiner 43 may determine, as the preliminary preceding vehicle 107, the peripheral vehicle 105 arranged closest to the centerline 110 of the intermediate area 103.

In the above embodiment, in step S3, the preceding vehicle determiner 43 determines, as the preceding vehicle 106, the peripheral vehicle 105 that overlaps with both the first estimated course 101 and the second estimated course 102. In another embodiment, the preceding vehicle determiner 43 may determine, as the preceding vehicle 106, the peripheral vehicle 105 that overlaps with at least one of the first estimated course 101 and the second estimated course 102.

The invention claimed is:

1. A mobile body control device configured to execute travel control of a mobile body, the mobile body control device comprising:

an external environment detector configured to detect at least one peripheral mobile body that exists on a periphery of the mobile body;

an estimated course calculator configured to calculate a first estimated course based on a yaw rate of the mobile body and calculate a second estimated course based on a steering angle of the mobile body;

a preceding mobile body determiner configured to determine, as a preceding mobile body, the peripheral mobile body that overlaps with at least one of the first estimated course and the second estimated course based on the first estimated course, the second estimated course, and a position of the peripheral mobile body; and a following controller configured to execute following control to follow the preceding mobile body, wherein in a case where the peripheral mobile body to be determined as the preceding mobile body does not exist, the preceding mobile body determiner is configured to determine, as a preliminary preceding mobile body, the peripheral mobile body that overlaps with an intermediate area defined between the first estimated course and the second estimated course, and the following controller is configured to execute the following control to follow the preliminary preceding mobile body.

2. The mobile body control device according to claim 1, wherein after the following controller starts the following control to follow the preliminary preceding mobile body and until the preceding mobile body determiner determines a new preceding mobile body, the following controller is configured to continue the following control to follow the preliminary preceding mobile body.

3. The mobile body control device according to claim 2, wherein in a case where the preceding mobile body determiner determines the new preceding mobile body after the following controller starts the following control to follow the preliminary preceding mobile body, the following controller executes the following control to follow the new preceding mobile body.

4. The mobile body control device according to claim 1, wherein in a case where a plurality of peripheral mobile bodies overlaps with the intermediate area, the preceding mobile body determiner is configured to determine, as the preliminary preceding mobile body, the peripheral mobile body arranged at a shortest distance from the mobile body.

5. The mobile body control device according to claim 1, wherein in a case where a plurality of peripheral mobile bodies overlaps with the intermediate area, the preceding mobile body determiner is configured to acquire a lane change direction and determine, as the preliminary preceding mobile body, the peripheral mobile body arranged closest to a side of the lane change direction among the plurality of peripheral mobile bodies.

6. The mobile body control device according to claim 1, wherein the preceding mobile body determiner is configured to determine the peripheral mobile body as the preliminary preceding mobile body upon detecting at a prescribed determination frequency that the peripheral mobile body overlaps with the intermediate area, to acquire a lane change direction, to divide the intermediate area into a first area and a second area based on the lane change direction, the first area being an area on a side of the lane change direction, the second area being an area on a side opposite to the lane change direction, and to set a second determination frequency greater than a first determination frequency, the second determination frequency being the determination frequency for determining the peripheral mobile body in the second area as the preliminary preceding mobile body, the first determination frequency being the determination frequency for determining the peripheral mobile body in the first area as the preliminary preceding mobile body.

7. A mobile body control method executed by a computer to execute travel control of a mobile body, the mobile body control method comprising:

detecting at least one peripheral mobile body that exists on a periphery of the mobile body;

calculating a first estimated course based on a yaw rate of the mobile body;

calculating a second estimated course based on a steering angle of the mobile body;

determining, as a preceding mobile body, the peripheral mobile body that overlaps with at least one of the first estimated course and the second estimated course based on the first estimated course, the second estimated course, and a position of the peripheral mobile body;

causing the mobile body to follow the preceding mobile body;

determining, as a preliminary preceding mobile body, the peripheral mobile body that overlaps with an intermediate area defined between the first estimated course and the second estimated course in a case where the peripheral mobile body to be determined as the preceding mobile body does not exist; and causing the mobile body to follow the preliminary preceding mobile body.

8. A non-transitory computer-readable storage medium, comprising a program for executing travel control of a mobile body, wherein the program, when executed by a computer, executes a mobile body control method comprising:

detecting at least one peripheral mobile body that exists on a periphery of the mobile body;

calculating a first estimated course based on a yaw rate of the mobile body;

calculating a second estimated course based on a steering angle of the mobile body;

determining, as a preceding mobile body, the peripheral mobile body that overlaps with at least one of the first estimated course and the second estimated course based on the first estimated course, the second estimated course, and a position of the peripheral mobile body;

causing the mobile body to follow the preceding mobile body;

determining, as a preliminary preceding mobile body, the peripheral mobile body that overlaps with an intermediate area defined between the first estimated course and the second estimated course in a case where the peripheral mobile body to be determined as the preceding mobile body does not exist; and
causing the mobile body to follow the preliminary preceding mobile body.

\* \* \* \* \*